March 23, 1954     A. C. SCINTA ET AL     2,672,641
WINDSHIELD CLEANER
Original Filed March 22, 1947
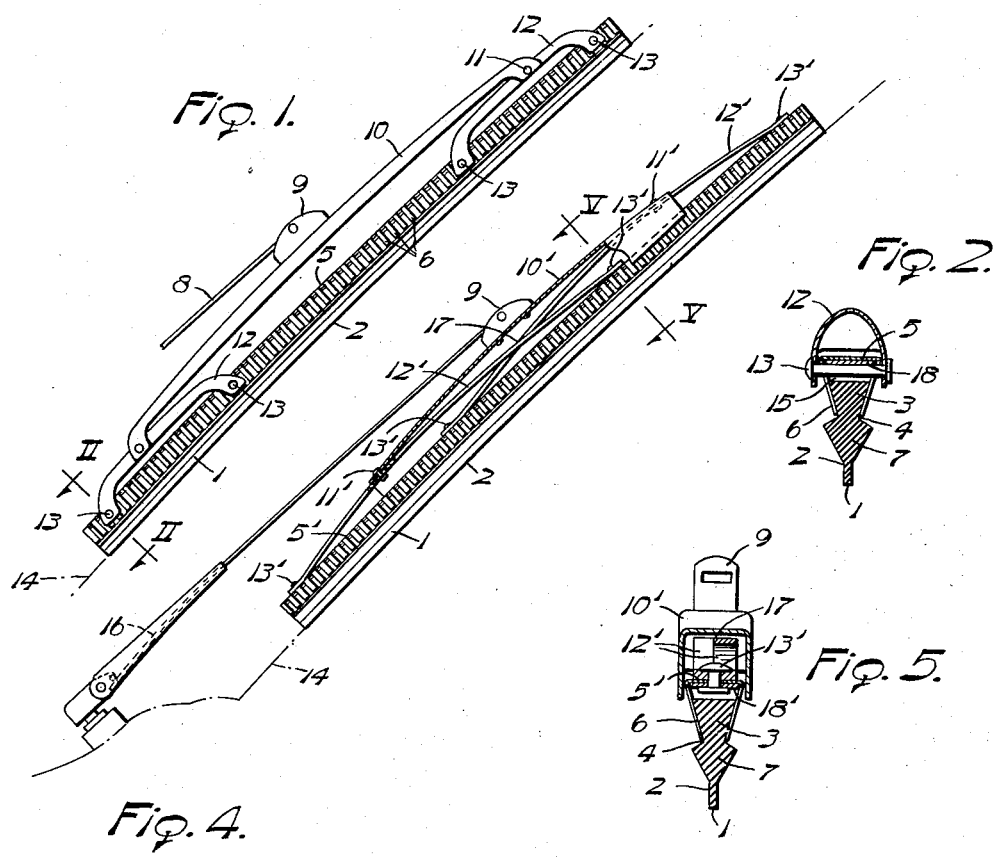
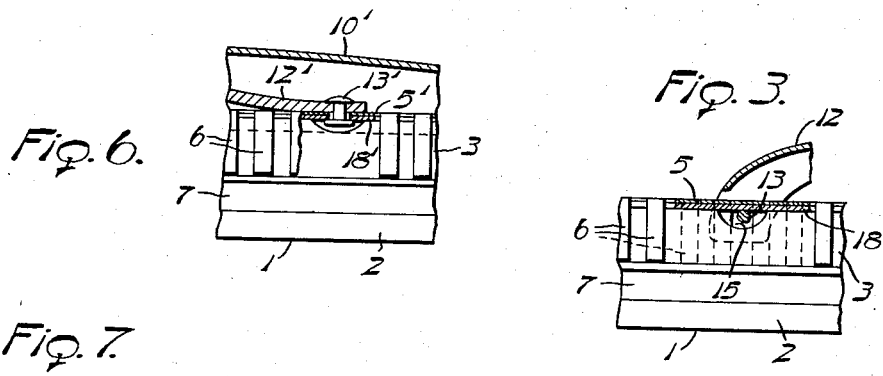
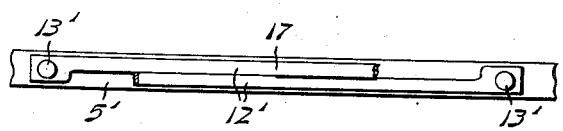
INVENTORS
Anthony C Scinta and
Anton Rappl
BY
Bean, Brooks, Buckley & Bean
ATTORNEYS Patented Mar. 23, 1954

2,672,641

UNITED STATES PATENT OFFICE 2,672,641

WINDSHIELD CLEANER

Anthony C. Scinta, Buffalo, N. Y., and Anton Rappl, deceased, late of Eggertsville, N. Y., by Marine Trust Company of Buffalo, executor, Buffalo, N. Y., assignors to Trico Products Corporation, Buffalo, N. Y.

Continuation of application Serial No. 736,492, March 22, 1947. This application June 25, 1953, Serial No. 364,046

2 Claims. (Cl. 15—245)

This application is a continuation of application No. 736,492 filed March 22, 1947, now abandoned.

This invention relates to the windshield cleaning art and primarily to a wiper or blade for the well-known automatic windshield cleaning mechanism currently used on the modern car.

More particularly the invention relates to a cleaner for wiping the surface of curved windshields and windows, the primary object of the present invention being to provide a wiper which will more effectively and uniformly wipe the curved surface.

It has heretofore been proposed to suspend a wiping member between spaced points of suspension, with the intermediate portion being given flexible support and acting in tension upon the windshield surface. The tensioned wiping edge would sometimes fail to effect a scrubbing action and possibly override any accumulated vision-obscuring matter on the windshield. This is due to the fact that the intermediate wiping portion has no substantial backing for lending support thereto.

The present invention further has for its object to provide a wiper for curved surfaces in which a wiping pressure would be more effectively distributed throughout the length of the wiping edge whereby a greater efficiency could be secured in operation.

Further, the invention will be found to reside in a curved surface wiper wherein its pressure distributing super-structure is associated with a continuous backing support for the wiping element in a manner to provide a compactness and low sitting structure for reducing its surface exposure to the wind currents in minimizing the lifting tendency of the latter and thereby insuring a more effective wiping action.

The invention will also be found to reside in an improved construction of wiper which is practical and one which will readily conform itself to the surface being wiped.

The foregoing and other objects will manifest themselves as the following description progresses, reference being had to the accompanying drawing, wherein Fig. 1 is a side elevation of a windshield cleaner constructed in accordance with the present invention;

Fig. 2 is a cross sectional view taken about on line 2—2 of Fig. 1;

Fig. 3 is a detailed view in side elevation, with a part of the yoke member broken away to more clearly show its connection to the blade;

Fig. 4 is a view similar to Fig. 1, but showing a modified arrangement;

Fig. 5 is a transverse sectional view about on line 5—5 of Fig. 4;

Fig. 6 is a fragmentary view partly in section showing the modified yoke connection with the blade; and Fig. 7 is a fragmentary longitudinal section taken in a plane immediately beneath the back wall of the primary yoke.

Referring more particularly to the drawing, the numeral 1 designates the rubber or squeegee body of the blade, the same having a wiping edge 2 along one margin which is preferably continuous from end to end. The opposite margin of this molded rubber body may be enlarged as at 3 and provided with opposite side faces 4 converging toward the wiping edge 2 to thereby give the same a generally triangular cross sectional shape. The rubber body is provided with a thin backing strip 5 of spring metal or the like, which backing strip has body embracing fingers 6 along its opposite margins for clampingly gripping upon the converging faces 4. Outwardly beyond the fingers 6 the rubber body may be formed with side ribs 7 to give support to the relatively thin wiping edge 2 and at the same time provide substantial thickness to the body where it may fold or bend over the outer ends of the fingers.

The wiper is attached to its carrying arm 8 by a suitable clip 9 and is directly supported by a pressure distributing frame or holder to which the clip is secured. The pressure distributing frame comprises a primary yoke member 10 and plural secondary yoke members 12 pivotally or flexibly connected to the opposite ends of the primary yoke, as by pins 11. The opposite ends of each secondary yoke member are pivotally connected by pins 13 to the blade body, as by passing the pins between adjacent fingers with sufficient clearance to provide ample play to accommodate relative movement between parts as the wiping edge conforms itself to changes in surface contour of the curved windshield surface indicated by the numeral 14. The rubber body may have its back margin notched out, as indicated at 15, to carry out the thought of this play.

From the foregoing it will be observed that the several yokes constitute a yoke assemblage in which the opposite ends of the wiping blade, as well as the intermediate blade portion, are provided with longitudinally spaced points of pressure application to which the pressure as provided by the arm spring 16 is distributed for urging the wiping edge into firm contact with the windshield surface.

By placing the pivotal connections 11 closer to the outer ends of the secondary yokes 12 there will be provided a differential yoke arrangement in which greater pressure will be applied to the outer points 13 of pressure application relative to the intermediate points at the adjacent or inner ends of such secondary yoke members. This differential yoke assemblage will therefore serve to apply heavier pressure at the opposite ends of the blade while providing a relatively lighter but positively applied pressure to the intermediate portion of the wiping edge. Therefore the wiping pressure will be uniformly distributed throughout the entire length of the blade for greater efficiency in use.

In the modified showing of Fig. 4 the inner ends of the secondary yoke members 12' are in the form of flat springs and are extended to cross or overlap each other, as at 17, thereby affording a torque resisting structure which will give to the intermediate blade portion proper support against twisting between the remote points of support. The opposite ends of the secondary yokes 12' are flexibly connected through pin and slot means 13' to the backing strip 5', thereby affording sufficient play to permit ample flexing of the blade as its wiping edge follows the windshield curvature. In the illustrated embodiment the pins or rivets are positioned normal to the backing strip, with the several slots being formed along the center line thereof. If desired, a second spring strip 18, 18' may underlie the backing strip to reinforce the same, and for a like purpose the inner extremities of the secondary yokes may be enlarged for receiving the fasteners, as shown in Fig. 7. The secondary yokes are flexibly connected by pin and slot means 11' to the opposite ends of the primary yoke 10' to afford sufficient play between parts for surface conformance of the wiping edge. The secondary yoke flat spring could have its end portions separately fastened to the primary yoke since its movement is a yielding one and its pressure applying arms are of relatively different strength and tension.

When wiping over a convex surface the back portion of the squeegee unit 1, 5' will move relative to the primary yoke 10' into the latter, and in this connection it will be observed that the primary yoke is curved longitudinally and of channel shape in cross section, Fig. 5. The back portion of the squeegee unit is designed to have a movement of recession within the channeled primary, this being permitted by the nested relation of the squeegee unit within the arcuate channel formation of the primary yoke. By reason of this nesting of the back portion of the squeegee unit within the channel of the primary yoke the pressure distributing superstructure 10', 12' will be brought down closer to the wiping element 1 and thereby reduce the height of the wiper on the windshield. The low sitting superstructure provides for compactness and reduces the upstanding surface area exposed to wind currents to minimize the lifting tendency of the latter upon the wiper. When moving over a concave surface the back portion of the wiper will have a movement in a direction outward of the primary channel.

Both forms of secondary yokes are so arranged with respect to their primary yokes that a differential pressure applying blade support is provided to give more uniformity in the distribution of the arm imposed spring pressure to the wiping edge. Obviously, this support will function on a plane surface as well as on a curved surface in efficiently distributing the arm pressure. The squeegee or rubber body may be readily removed from the pressure differential support by simply sliding the body lengthwise from between the embracing fingers 6 when it is desired to replace the same with a new wiping edge. These fingers together with the backing strip 5, 5' form a seat for the squeegee body. At the same time these fingers do not detract from the flexibility of the backing strip since the fingers are free to move relative to each other.

In the embodiment of Figs. 4 through 7, the secondary yokes provide transversely flat underfaces which recede into the primary channel as the secondaries carry the squeegee unit therewith, such flat underfaces moving closer to the transversely flat bottom of the inverted channel to jointly form therewith a supporting surface for the squeegee unit as its back portion recedes thereinto.

By reason of the foregoing construction and arrangement, the inner ends of the secondary yokes are disposed intermediate the outer ends of the primary yoke. The pressure differential provides for the application of a lighter pressure at such intermediate points relative to the urge impressed upon the outer or opposite ends of the blade. This gives a controlled distribution of the arm impressed urge, with such urge being positively applied through the secondary yokes 12 and 12'. The outer ends of the primary yoke are flexibly connected by the pivot 11 in one instance and by the pin and slot connection 11' in the second instance to give freedom of movement to the blade in conforming its wiping edge to the windshield surface. Should occasion demand, a reversal of the lever differential may be obtained for giving a relatively heavier pressure to the intermediate portion of the blade as compared to that applied to the opposite ends thereof.

The connecting members 13' not only serve as torque-resisting members in that they resist rotational movement of the backing strip but they also serve to hold the multiple leaves 5' and 18' in assembled relation thereby providing a backing for the blade of leaf spring construction for greater resiliency, one leaf only being formed with the blade gripping fingers 6. These torque-resisting members 13' slidably support the backing strip up against the underfaces of the ends of the secondary yokes to insure a nesting relation of the backing strip with the primary channel when passing over a convex surface. This nesting relation between the side walls of the primary channel affords lateral support for the sliding connection 13' and, further, it provides for a compact wiper structure with a minimum surface exposure to the cross wind currents which tend to lift the wiper off the glass.

While the foregoing description has been given in detail it is not the intention to thereby limit the invention since the inventive principles involved are capable of assuming other physical embodiments without departing from the spirit of the invention and the scope of the appended claims.

What is claimed is:

1. A windshield wiper for cleaning a curved surface comprising a squeegee unit including a flexible blade and flexible backing means therefor, said blade comprising a wide back portion, a first pair of opposite side faces extending downwardly from said back portion and converging inwardly toward each other, a pair of side ribs extending outwardly from the inner portion of said inwardly converging side faces, a second pair of downwardly and inwardly converging side faces extending from the outer portion of said side ribs, and a wiping edge positioned below said second pair of converging side faces, said backing means including a first flat resilient member overlying said back portion of said blade and having a plurality of closely spaced fingers depending therefrom, and a second flat resilient member underlying said first resilient member, said fingers converging downwardly and inwardly toward each other and clampingly embracing said first pair of depending side faces of said blade, said fingers terminating adjacent the point of juncture between said first pair of side faces and said ribs of said blade, and means for applying pressure to said unit for conforming the same to the surface to be wiped, said pressure-applying means including a primary member and plural secondary members secured to said primary member adjacent the ends thereof, said secondary members being secured to said unit at longitudinally spaced points.

2. A windshield wiper for cleaning a curved surface comprising a squeegee unit including a flexible blade and flexible backing means therefor, said blade comprising a wide back portion, a first pair of opposite side faces extending downwardly from said back portion and converging inwardly toward each other, a pair of side ribs extending outwardly from the inner portion of said inwardly converging side faces, a second pair of downwardly and inwardly converging side faces extending from the outer portion of said ribs, and a wiping edge positioned below said second pair of converging side faces, said backing means including a resilient member overlying said back portion of said blade and having a plurality of closely spaced fingers depending therefrom, said fingers converging downwardly and inwardly toward each other and clampingly embracing said first pair of depending side faces of said blade, said fingers terminating adjacent the point of juncture between said first pair of side faces and said ribs of said blade, and means for applying pressure to said unit for conforming the same to the surface to be wiped, said pressure-applying means including a primary member and plural secondary members secured to said primary member adjacent the ends thereof, said secondary members being of channel form in cross section and having end portions straddling said unit, and pivot pins extending through said end portions and positioned between adjacent fingers of said backing means with sufficient clearance between said adjacent fingers to provide ample play to accommodate relative movement between said unit and said pivot pins as the wiping edge of said unit conforms itself to changes in surface contour of the curved surface being wiped.

ANTHONY C. SCINTA.
MARINE TRUST COMPANY
OF BUFFALO, NEW YORK,
By J. G. HOLZMAN,
*Assistant Vice-President.*
Executor of the last will and testament of Anton Rappl, deceased.

References Cited in the file of this patent

UNITED STATES PATENTS

| Number | Name | Date |
|---|---|---|
| 2,596,063 | Anderson | May 6, 1952 |
| 2,634,446 | Mackie et al. | Apr. 14, 1953 |
| 2,649,605 | Scinta et al. | Aug. 25, 1953 |

FOREIGN PATENTS

| Number | Country | Date |
|---|---|---|
| 820,156 | France | July 26, 1937 |